Figure 1:
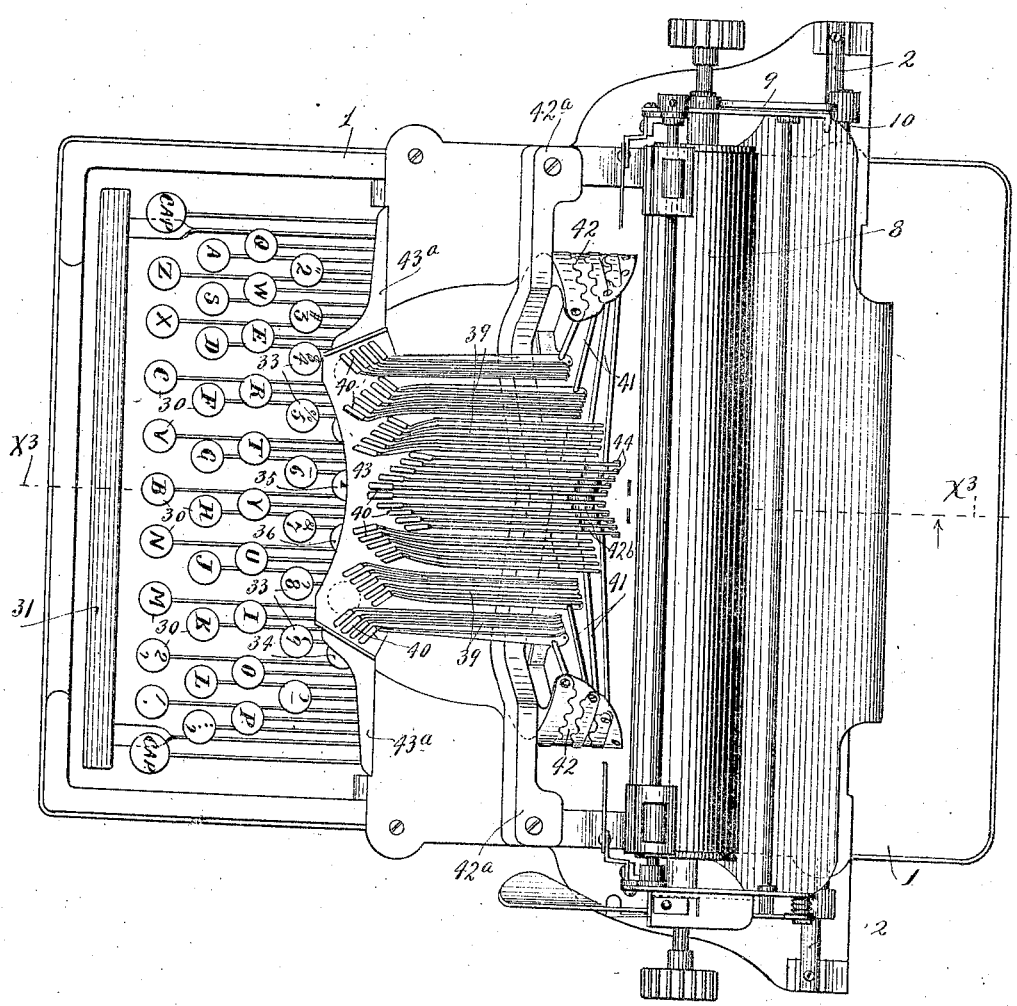

No. 841,871. PATENTED JAN. 22, 1907.
F. W. HUNT.
TYPE WRITER WITH TABULATING MECHANISM.
APPLICATION FILED MAR. 28, 1904.

8 SHEETS—SHEET 1.

Witnesses.
A. H. Opsahl.
E. W. Jeppesen.

Inventor.
Frederick W. Hunt
By his Attorneys.
Williamson & Merchant

No. 841,871. PATENTED JAN. 22, 1907.
F. W. HUNT.
TYPE WRITER WITH TABULATING MECHANISM.
APPLICATION FILED MAR. 28, 1904.

8 SHEETS—SHEET 2.

No. 841,871. PATENTED JAN. 22, 1907.
F. W. HUNT.
TYPE WRITER WITH TABULATING MECHANISM.
APPLICATION FILED MAR. 28, 1904.
8 SHEETS—SHEET 3.
Fig. 3.
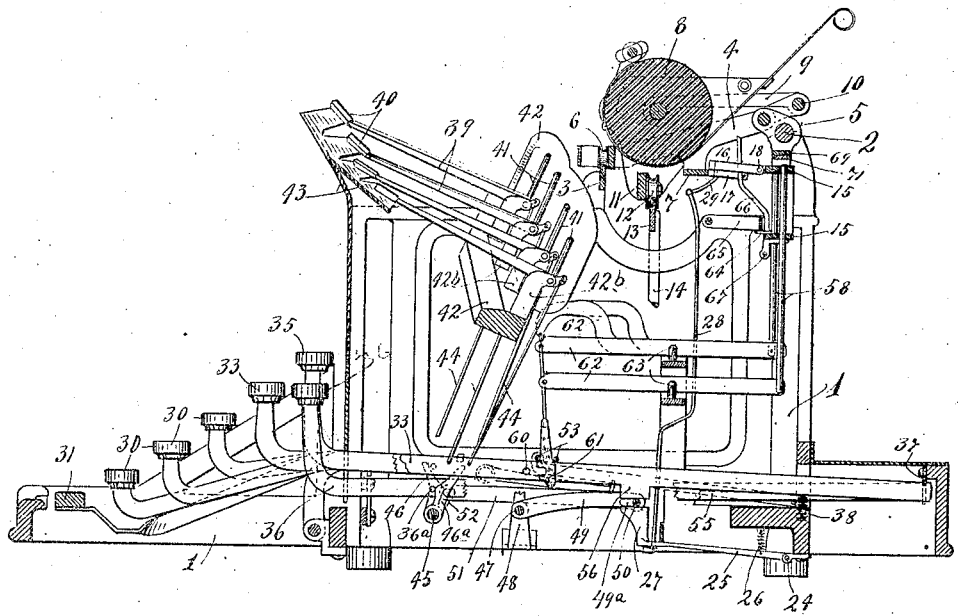
Fig. 3ª.
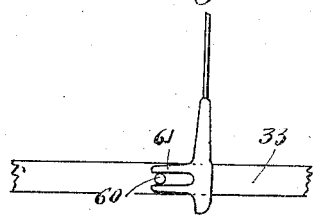
Witnesses.
A. H. Opsahl.
E. W. Jeppesen.
Inventor.
Frederick W. Hunt
By his Attorneys
Williamson & Merchant No. 841,871. PATENTED JAN. 22, 1907.
F. W. HUNT.
TYPE WRITER WITH TABULATING MECHANISM.
APPLICATION FILED MAR. 28, 1904.
8 SHEETS—SHEET 5.
*Fig. 5.*
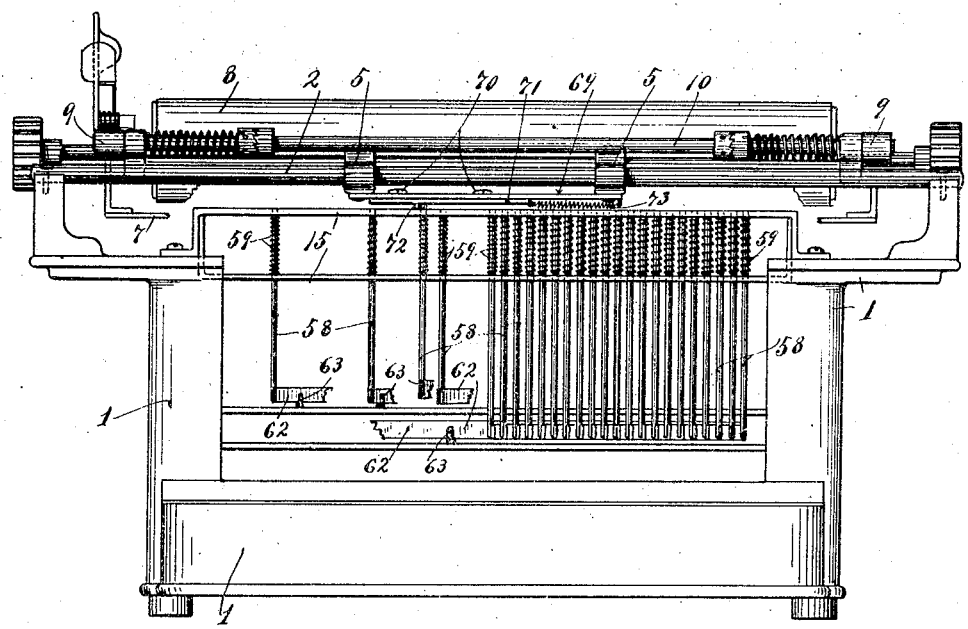
*Fig. 5.ª*
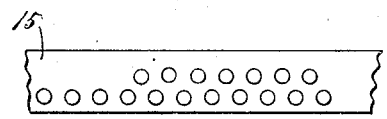
Witnesses.
A. H. Opsahl.
E. W. Jeppesen.
Inventor:
Frederick W. Hunt.
By his Attorneys.
Williamson & Merchant No. 841,871. PATENTED JAN. 22, 1907.
F. W. HUNT.
TYPE WRITER WITH TABULATING MECHANISM.
APPLICATION FILED MAR. 28, 1904.

8 SHEETS—SHEET 6.

Witnesses.
A. H. Opsahl.
E. W. Jippisen.

Inventor.
Frederick W. Hunt
By his Attorneys
Williamson Merchant

No. 841,871. PATENTED JAN. 22, 1907.
F. W. HUNT.
TYPE WRITER WITH TABULATING MECHANISM.
APPLICATION FILED MAR. 28, 1904.
8 SHEETS—SHEET 7.
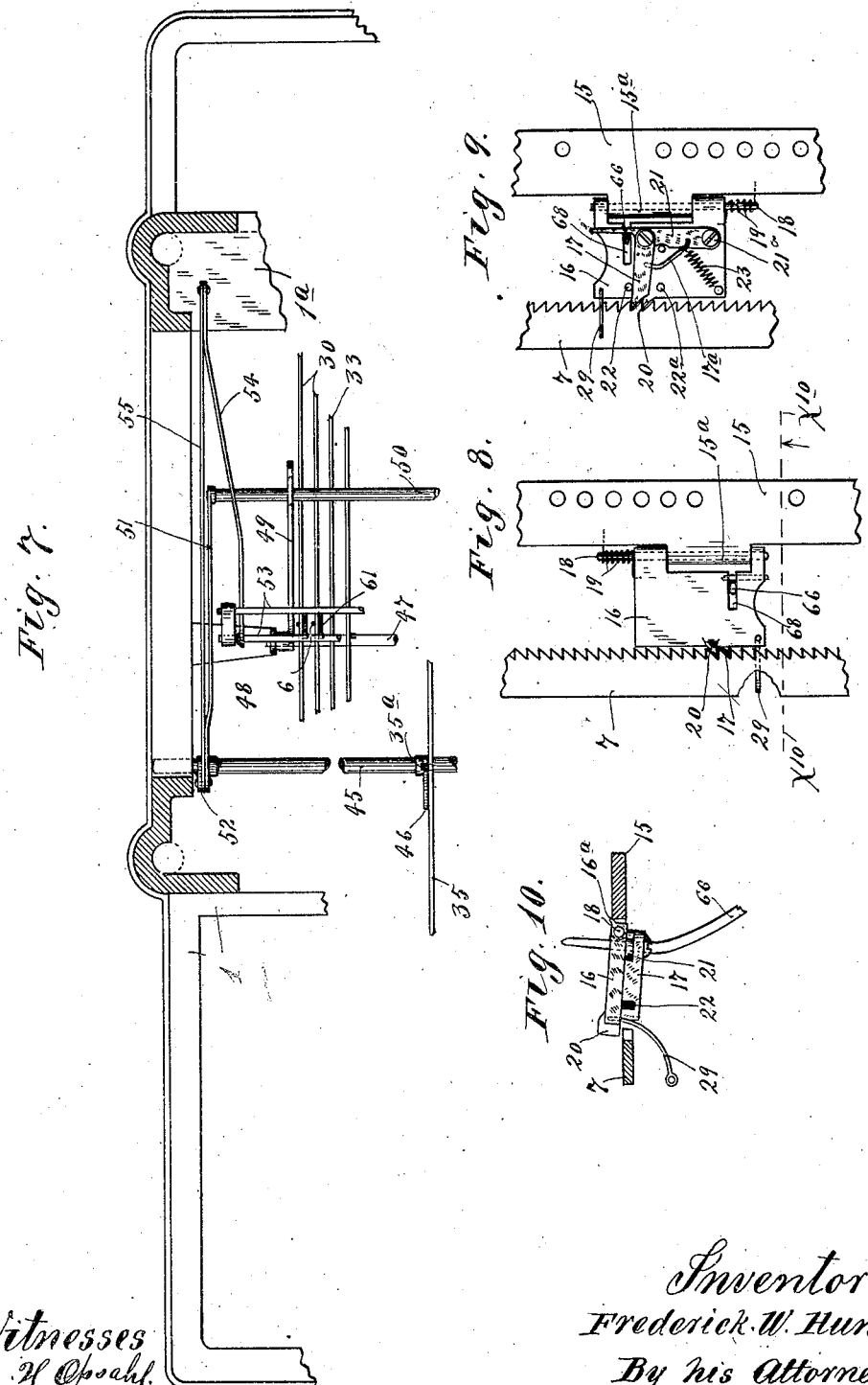
Witnesses
A. H. Opsahl.
E. W. Jeppesen.
Inventor.
Frederick W. Hunt
By his Attorneys
Williamson & Merchant No. 841,871. PATENTED JAN. 22, 1907.
F. W. HUNT.
TYPE WRITER WITH TABULATING MECHANISM.
APPLICATION FILED MAR. 28, 1904.

8 SHEETS—SHEET 8.

*Fig. 11.*

UNITED STATES PATENT OFFICE.

FREDERICK W. HUNT, OF MINNEAPOLIS, MINNESOTA.

TYPE-WRITER WITH TABULATING MECHANISM.

No. 841,871.　　　　　Specification of Letters Patent.　　　　Patented Jan. 22, 1907.

Application filed March 28, 1904. Serial No. 200,222.

*To all whom it may concern:*

Be it known that I, FREDERICK W. HUNT, a citizen of the United States, residing at Minneapolis, in the county of Hennepin and State of Minnesota, have invented certain new and useful Improvements in Type-Writers with Tabulating Mechanism; and I do hereby declare the following to be a full, clear, and exact description of the invention, such as will enable others skilled in the art to which it appertains to make and use the same.

My invention relates to type-writers, and has for its especial object to provide improved tabulating mechanism therefor.

The invention consists in the novel devices and combinations of devices hereinafter described, and defined in the claim.

The improved tabulating mechanism illustrated in the drawings and hereinafter described, while capable of various arrangements to meet the requirements of different kinds of work, is shown as designed and especially adapted to meet the requirements of the laundry business in making out lists, bills, &c., by the use of a type-writer.

The invention is illustrated in the accompanying drawings, wherein like characters indicate like parts throughout the several views.

Figure 2:
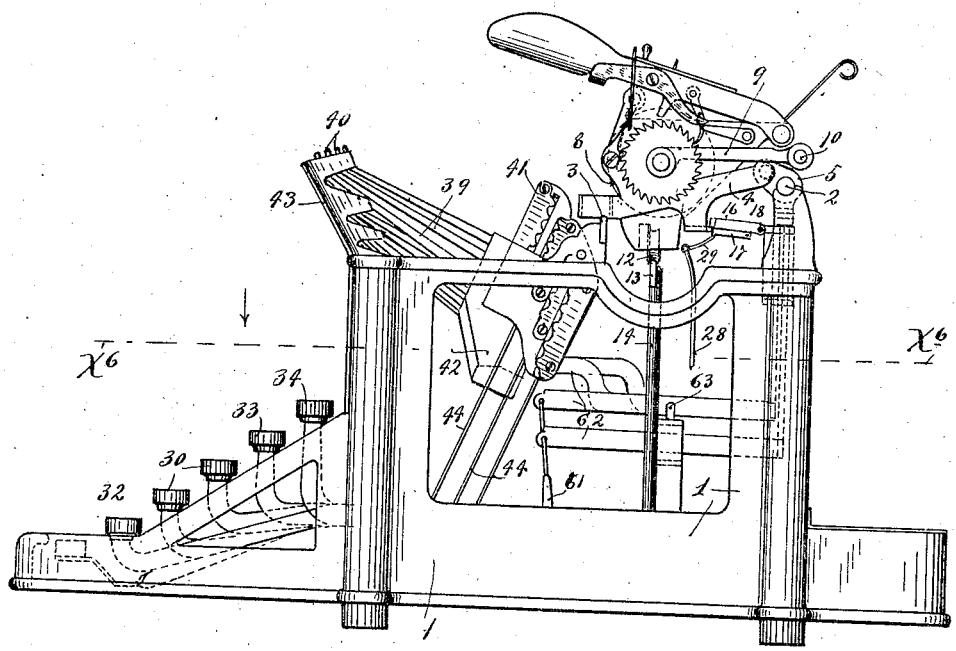
Figure 4:
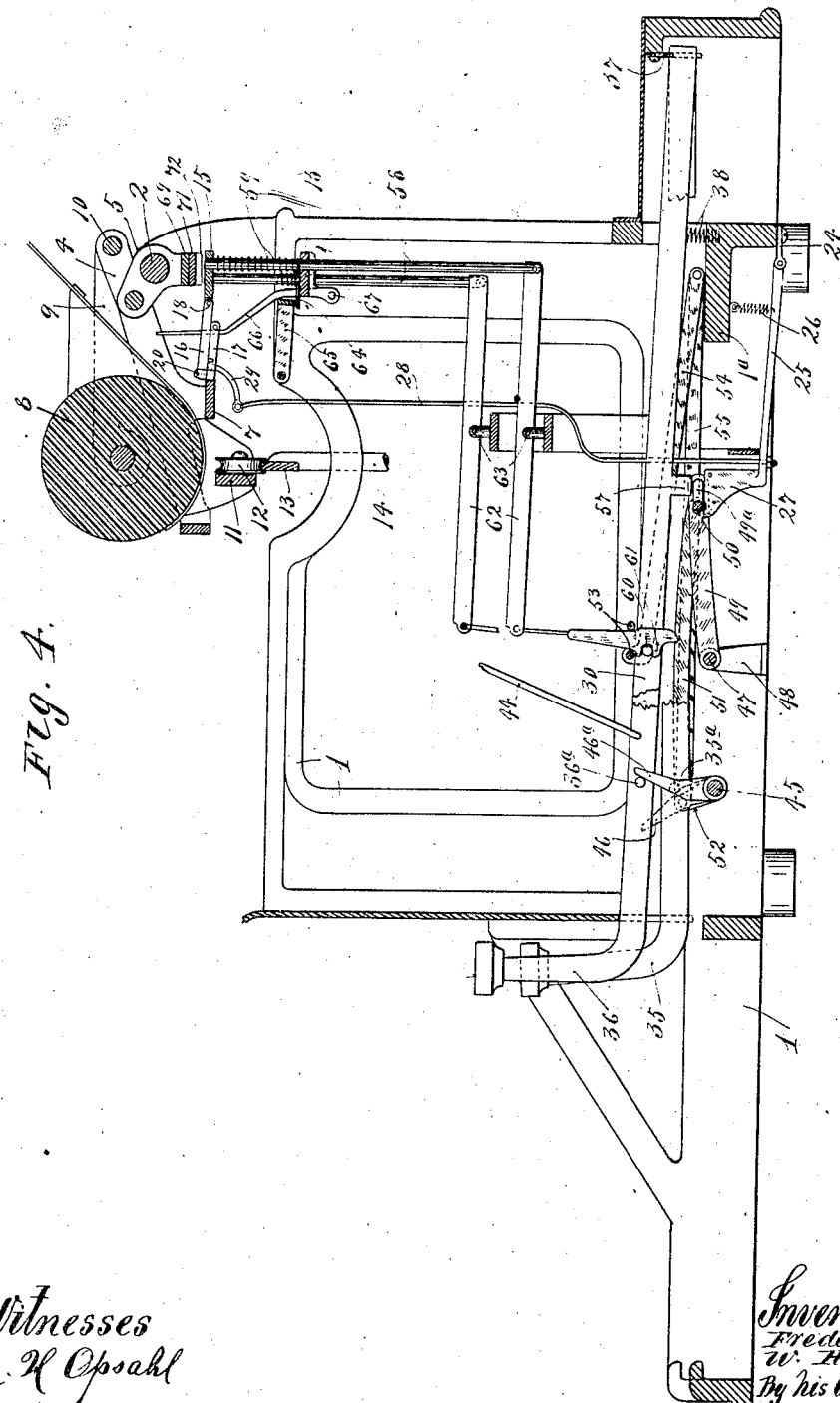
Figure 6:
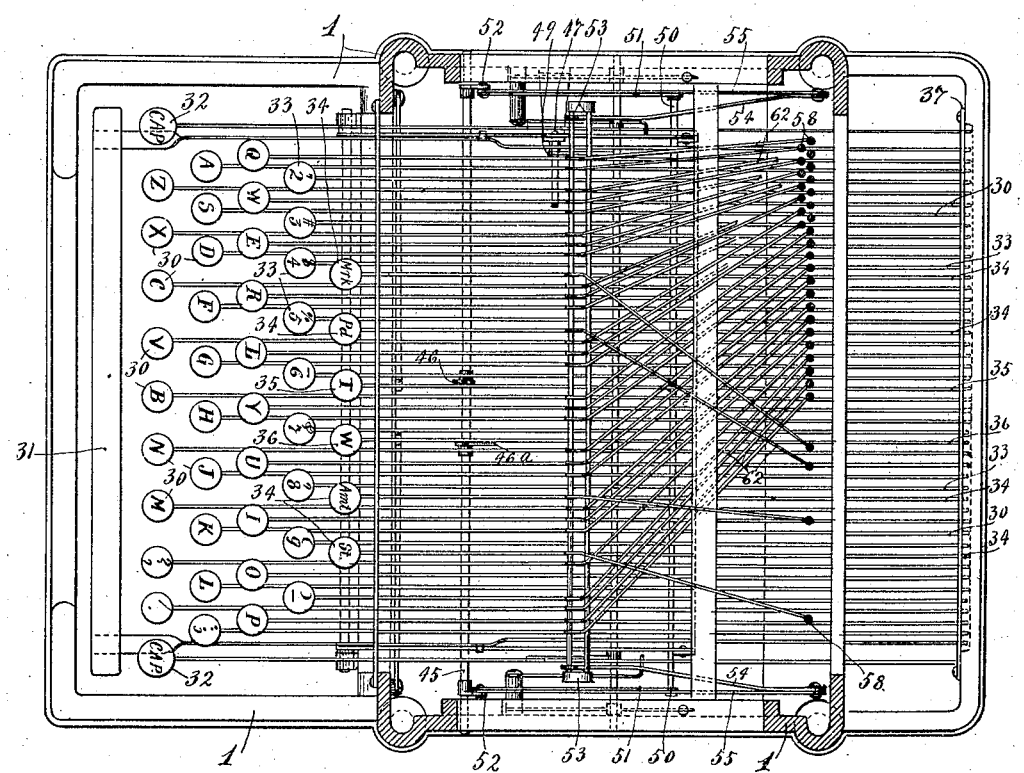

Figure 1 is a plan view showing a typewriter with my improved tabulating mechanism applied thereto and illustrating also a novel arrangement of the type-bars and their bearings. Fig. 2 is a left side elevation of the machine. Fig. 3 is a vertical section taken through the machine from front to rear approximately on the line $x^3$ $x^3$ of Fig. 1, some parts being broken away. Fig. $3^a$ is a detail in side elevation, showing one of the coupling-heads which coöperates with one of the digit-keys. Fig. 4 is a skeleton view in section on the same line as Fig. 3, but showing the parts on a larger scale and with many of the parts of the machine removed. Fig. 5 is a rear elevation of the machine. Fig. $5^a$ is a detail in plan, showing the arrangement of certain of the tabulating-stops. Fig. 6 is a horizontal section taken through the machine approximately on the line $x^6$ $x^6$ of Fig. 2. Fig. 7 is a detail in horizontal section on the same line as Fig. 6, showing fragmentary portions of the mechanism shown in said Fig. 6. Fig. 8 is a detail in plan, showing the carriage-escapement, its support, and a portion of the escapement-bar. Fig. 9 is a bottom plan view of the parts shown in Fig. 8. Fig. 10 is a transverse section on the line $x^{10}$ $x^{10}$ of Fig. 8. Fig. 11 is a plan view with parts broken away, showing a billing-sheet.

The type-writing machine hereinafter described, except as more specifically pointed out, is of standard construction—that is, is provided with what is known as the "universal keyboard," the usual escapement mechanism, a carriage impression-roll, and impression-roll-operating mechanism substantially identical with that of a so-called "Densmore" type-writer, the operation of which parts are well understood, and hence for the purposes of this case may be briefly noted.

The numeral 1 indicates as an entirety the framework of the type-writer. The usual carriage-guiding rod 2 and guiding bar or rail 3 extend parallel to each other transversely of the machine and are rigidly secured at their ends to the framework 1.

The numeral 4 indicates the carriage-frame, which is mounted to travel in the usual way on the guide-rod 2 and rail 3, having, as shown, lugs 5, which slide upon said rod, and having rollers 6, that travel over said rail. The usual ratchet-toothed escapement-bar 7 is rigidly attached at its ends to the ends of the carriage-frame 4.

The impression-roller 8 is mounted in a supplemental frame 9, which is pivoted to the frame 4 in the usual way, as shown at 10. The supplemental frame 9 has a bar 11 equipped with the roller 12, that runs over the rail 13, carried by vertically-movable supporting-rods 14, which rods 14 receive vertical movements in the usual way from the "cap" or shift-key. (For the above construction see particularly Figs. 2, 3, 4, and 8.) The type-writer carriage is of course in practice put under strain to move from the right toward the left with respect to the operator of the machine, or from left toward the right with respect to the rear elevation, Fig. 5, by the usual carriage-tension device. (Not illustrated in the drawings.)

Extending transversely of the machine, below the guide-rod 2 and rigidly secured at their ends to the sides of the frame 1, is a pair of guide-bars 15. (See Figs. 3, 4, and 5.) The type-writer escapement, which is of standard construction, is made up of a pair of members 16 17. The member 16 is by a rod 18 pivotally connected to a lug $15^a$ on the upper guide-bar 15 and is yieldingly held downward by a coiled spring 19, which spring, as shown, is placed on one end of the rod 18, with one end reacting against the member 16 and the other end reacting against the said bar 15. The said member 16 is in the form of a plate and is provided with a ratchet-tooth 20, which when said plate is forced downward engages one of the teeth of the ratchet-bar 7 of the type-writer carriage. The escapement member 17 is in the form of a small pawl, which is pivoted to a lever 21, which in turn is pivoted at 21$^a$ to the plate or member 16, as best shown in Figs. 8, 9, and 10. The pawl member 17 has a limited movement between a pair of stops 22 and 22$^a$ on the plate or member 16 and is subject to a spring 23, that tends to throw the said pawl against the stop 22. (See Fig. 9.) The plate member 16 is formed with a shoulder 16$^a$, that engages with the upper bar 15 to limit its upward movement. (See Fig. 10.) The spring 23 is, as shown, attached to the plate 16 and to a projection 17$^a$ of the pawl 17, the spring being thus so disposed that it not only tends to throw said pawl against the stop 22, but also tends to throw the arm 21 forward and the said pawl into engagement or into a position for engagement with the teeth of the ratchet-bar 7.

With the escapement above described the pawl 17 normally engages the ratchet-bar 7, at which time the said pawl is pressed into line with the ratchet-tooth 20 of the plate member 16. The escapement movement is produced by drawing downward the plate member 16, so as to engage the tooth 20 thereof with the ratchet-bar 7 and allow the pawl member 17 to move forward for engagement with the next tooth of the said bar. This being done and the escapement being again moved upward, the pawl 17 engages the said ratchet-bar and is moved back against the stop 22$^a$, thus permitting the type-writer carriage to make one step of movement.

Pivoted, as shown, to a small bearing 24 on the base of the type-writer frame is an escapement-tripping lever 25, which is usually held upward by a light spring 26 and is provided at its free forward end with a bearing-head 27. (See Figs. 3 and 4.) This tripping-lever 25 is connected by a light rod 28 to a depending arm 29, attached to the escapement lever or plate 16.

The type-writer is provided with the usual character-keys 30, escapement-bale 31, shifting keys 32, and numeral or digit keys 33 and in addition thereto is provided with so-called "special tabulating-keys" 34 and a pair of switch-keys 35 and 36, which keys are all fulcrumed at their rear ends to the base of the machine-frame on a fulcrum-bar 37 and are all, except said switch-keys, yieldingly pressed upward by springs 38. The finger-pieces or heads of the keys 34, 35, and 36 are arranged to form the upper row of the keyboard.

The type-bars 39, which are grouped and mounted in a novel manner, carry type-heads 40 at their free ends and at their other ends are provided with shafts 41, mounted in a segmental bearing 42. This bearing 42 is rigidly secured in a slightly-inclined position, with its open portion upward, being, as shown, provided with extended ends 42$^a$, that rest upon and are secured to the top of the machine-frame 1, as best shown in Fig. 1. Also, as shown, said bearing 42 is formed with radially-projecting bearing-lugs 42$^b$, in which the inner ends of the shafts 41 are mounted. Normally the type-heads 40 rest upon a concaved stop-plate 43, having a depending web 43$^a$, which is secured to the upper portion of the frame 1 just above the keyboard. The type-bars, the type-heads, and their bearing-shafts 41 are arranged in groups that are offset in zigzag order, so that they are brought within very small compass or space, being in practice arranged within approximately one-fourth of a complete circle. The said bearing-shafts 41 are quite long, and hence securely hold the type-bars against lateral movement and for true swinging movements to the proper impression-point.

The character-keys 30 and the digit or numeral keys 33 are connected each to one of the type-bars 39 by a light connecting-rod 44, so that when one of the said keys is depressed the corresponding type-bar will be given an operative movement. The inking-ribbon is not shown in the drawings; but the means for supporting and moving the same may be of any suitable form, not necessary for the purposes of this case to consider.

Extending transversely of the machine, below the keys, is a rock-shaft 45, (see Figs. 3, 4, 6, and 7,) which shaft is mounted at its ends in the sides of the frame 1. At its intermediate portion said rock-shaft is provided with a pair of reversely-beveled vertically-extended cam-arms 46 and 46$^a$. The switch-key 35 carries a cam-pin 35$^a$, which acts upon the beveled surface of the cam-arm 46, and the switch-key 36 carries a cam-pin 36$^a$, which is adapted to act upon the beveled surface of the cam-arm 46$^a$. One or other of the switch-keys 35 36 will always be pressed down, and these are the only keys of the keyboard that are not yieldingly pressed upward by springs 38. When the switch-key 35 is pressed downward, as shown in Fig. 4, the cam-arms will be rocked forward, and when the key 36 is pressed downward the said cam-arms will be rocked rearward, as shown in Fig. 3. The act of pressing one of the said switch-keys downward causes the other switch-key to be raised by a cam action thereon, due to the engagement of its cam-pin with its cooperating cam-arm.

Below the keys, at the rear of the rock-shaft 45, is another rock-shaft 47, mounted at its ends in bearing-brackets 48, rigidly secured to the sides of the frame 1. This rock-shaft 47 has rigidly secured to it a pair of laterally-spaced arms 49, (see particularly Figs. 4 and 7,) which arms stand outside of the keys and are formed at their free ends with slots 49ª. A depressing-rod 50 extends transversely of the machine through the slots 49ª and rests upon the head 27 of the escapement-tripping lever 25. The slots 49ª limit the lateral movements of the rod 50 to positions always over the said head 27, and the arms 49 hold the said rod always in a horizontal plane when the same is moved downward to depress the said lever 25. At its ends the rod 50 is connected by light connecting-rods 51 to vertically-projecting arms 52, secured on the rock-shaft 45 near its ends. (See Figs. 4 and 7.)

Resting or riding loosely on top of the keys is a so-called "shipper-frame" 53, made up of a pair of light parallel rods rigidly tied together at their ends, as best shown in Figs. 3, 4, 6, and 7. To ends of one of the rods of said frame is pivotally attached a pair of rearwardly-projecting links 54, the rear ends of which rest upon and ride over a shelf-like portion 1ª of the frame 1 and are in turn connected by links 55 to the arms 52 of the rock-shaft 45. As is evident, when the rock-shaft 45 is moved, as above described, by the depression of one or the other of the switch-keys 35 36 the depressing-rod 50 and the shipper-frame 53 will be moved simultaneously forward or simultaneously rearward, according to which of the said switch-keys is depressed.

All of the numeral or digit keys 33 and two of the character-keys—to wit, those marked with the letters "O" and "L" and which are used to print the numerals "0" and "1"—are provided with depending presser-lugs 56, (see Fig. 3,) that overlie the depressing-rod 50 in all of its adjustments. On the other hand, all of the character-keys 30 except the two above noted are provided with similar depressing-lugs 57, (see Fig. 4,) that overlie the said tripping-rod 50 when the latter is in its rearmost adjustment, but not when it is moved forward, as shown in said Fig. 4, by the depression of the switch-key 35. The so-called "special tabulating-keys" 34 and the switch-keys 35 36 are not of course provided with depressing-lugs.

Working vertically upward through the two guide-bars 15 and depending below the same is a series of stop-plungers 58, that are yieldingly held downward in inoperative positions by light coiled springs 59, the lower ends of which springs are attached to said plungers and the upper ends of which react against the upper bar 15. (See Figs. 3, 4, 5, and 6, in all of which views the said plungers are shown, the springs being shown only in Fig. 5.) As shown, there are thirty-two of these stop-plungers, and in the keyboard, exclusive of the two character-keys 30 marked "L" and "O," the two cap or shift keys 32, the eight digit-keys 33, and the two switch-keys 35 36, there are twenty-eight character-keys 30 and four special tabulating-keys 34, each of which thirty-two keys is utilized, under certain conditions presently to be noted, to throw up one of the thirty-two stop-plungers. Hence each of these thirty-two keys is provided with a laterally-projecting coupling-pin 60, (see Figs. 3 and 4,) and for coöperation with each coupling-pin there is provided a notched coupling-head 61. These thirty-two coupling-heads 61 are placed between the rods of the shipper-frame 53 (see Figs. 3, 4, and 7) and are pivotally suspended from the forward ends of levers 62, which levers are pivotally attached at their rear ends one to each stop-plunger 58 and are fulcrumed at their intermediate portions on transverse fulcrum-bars 63, supported by the frame 1. The four coupling-heads 61, which coöperate with the four special tabulating-keys 34, have jaws of such length that they are never moved out of engagement with the pins 60 of said keys, and hence these four special tabulating-keys are always operatively connected to throw up their stop-plungers 58. (See Fig. 3ª.) By rearward movement of the shipper-frame 53 all but the four long-jawed coupling-heads 61 are thrown into inoperative positions, as shown in Fig. 3, and by forward movement of the said frame the notches of said coupling-heads are engaged with the coöperating coupling-pins 60, thereby coupling the corresponding stop-plungers to the corresponding twenty-eight character-keys 30, which are then to be used as tabulating-keys. Just above the lower guide-bar 15 each stop-plunger 58 is provided with a forwardly-projecting pin 64. These pins 64 all underlie the transverse portion of a bail 65, which is pivoted to the sides of the frame 1, as shown in Figs. 3 and 4, so that when any one of the said stop-plungers is raised the said bail will be raised.

The numeral 66 indicates an escapement-tripping finger, which is pivoted at its lower end to a bearing 67 on the lower guide-bar 15 (see Figs. 3 and 4) and the upper free end of which works through a slot 68 in the escapement member or plate 16 and engages with the projecting free end of the escapement-pawl-carrying lever 21. (See Figs. 8, 9, and 10.) Just above the transverse portion of the bail 65 the tripping-finger 66 is bent forward, so that when the said bail is raised by one of the stop-plungers the said transverse portion thereof will cam the said tripping-finger rearward and carry the escapement-pawl 17 backward into an inoperative position, as shown in Figs. 9 and 10, so that the escapement is then thrown entirely out of action on the ratchet-bar 7.

Rigidly secured to the lower portions of the lugs 5 of the carriage-frame 4 (see Fig. 5) is a bar 69, and secured for a limited sliding movement to the under side of this bar by means of screw-and-slot connections 70 is a plate 71, having a depending stop-lug 72, which is adapted to engage with the upper end of any one of the stop-plungers 58 which happens to be thrown up. A light coiled spring 73, attached at one end to the bar 69 and at its other end to the sliding plate 71, yieldingly draws the said plate to its limit toward the right with respect to Fig. 5. The purpose of this spring is to cushion the impact produced by the engagement of the stop-lug 72 with one of the stop-plungers 58. This spring, however, is of such light tension that it will be overcome by the carriage-tension or spring-feeding device.

Referring now to the keyboard and directing attention particularly to Fig. 6, it will be noted that the switch-key 35 is marked with the letter "T," which stands for "tabulate," while the switch-key 36 is marked with the letter "W," which stands for "write." The four special tabulating-keys 34 from the right toward the left are marked, respectively, "St.," "Amt.," "Pd.," and "Mrk.," and by reference to Fig. 11 it will be noted that these abbreviations of the special tabulating-keys are found in the appropriate columns (spelled in full) on the list billing-sheet z.

By reference to Fig. 6 it will be further noted that the four special tabulating-keys 34 and the twenty-eight character-keys 30, which are adapted to be used as tabulating-keys, are arranged to operate the thirty-two stop-plungers 58 in the following order, the said stops being counted in regular order from the right toward the left, to wit: Special tabulating-key marked "St." operates stop 1, special tabulating-key marked "Amt." operates stop 2, special tabulating-key marked "Pd." operates stop 3, special tabulating-key marked "Mrk." operates stop 4, character-key marked ":" and ";" operates stop 5, character-key marked "P" operates stop 6, character-key marked "." and "/" operates stop 7, character-key marked ")" and "—" operates stop 8, character-key marked "?" and "," operates stop 9, character-key marked "K" operates stop 10, character-key marked "I" operates stop 11, character-key marked "M" operates stop 12, character-key marked "J" operates stop 13, character-key marked "U" operates stop 14, character-key marked "N" operates stop 15, character-key marked "H" operates stop 16, character-key marked "Y" operates stop 17, character-key marked "B" operates stop 18, character-key marked "G" operates stop 19, character-key marked "T" operates stop 20, character-key marked "V" operates stop 21, character-key marked "F" operates stop 22, character-key marked "R" operates stop 23, character-key marked "C" operates stop 24, character-key marked "D" operates stop 25, character-key marked "E" operates stop 26, character-key marked "X" operates stop 27, character-key marked "S" operates stop 28, character-key marked "W" operates stop 29, character-key marked "Z" operates stop 30, character-key marked "A" operates stop 31, character-key marked "Q" operates stop 32.

Operation: When the machine is to be used to print numerals and characters in the usual way, the switch-key 36, marked with the letter "W," must be depressed so as to disconnect the short-jawed coupling-heads 61 from the coupling-pins 60 of the twenty-eight character-keys provided with the said pins. (See Fig. 3.) Furthermore, it will be remembered that when the said key 36 is depressed the depressing-rod 50 is moved back under the depressing-lugs 57 of the twenty-eight character-keys 30, and it will be further remembered that the said rod in all of its adjustments stands under the lugs 56 of the numeral or digit keys 33 and of the two character-keys marked with the letters "o" and "l." Hence under the above adjustments of the parts shown in Fig. 3 when any one of the keys noted is depressed the escapement will be actuated and the carriage will be fed in the usual way. When the carriage is drawn to the right, the sheet z will stand in position to have written thereon in the column headed by the word-name the name of the person whose account is being listed. This being done by striking the proper character-keys, the first stop-plunger 58 is raised by the depression of the special character-key marked "St." It will be remembered that when one of the stop-plungers is raised its pin 64 lifts the bail 65, throws the escapement-tripping finger 56 rearward, and throws the escapement out of action. The first stop being thus raised and the escapement being thrown out of action, the carriage will move toward the left until the stop-lug 72 of the plate 70 strikes the first stop 58, thus stopping the carriage, with the sheet z in position to have printed thereon in the column headed "Street" the address of the person whose account is being listed. The address is then written by striking in succession the proper character-keys and numeral-keys; and thereafter the special tabulating-keys marked "Amt.," "Pd.," and "Mrk." are depressed to aline the columns indicated at the printing-point, where the proper characters may be printed by striking the proper keys. It will of course be understood that whenever any one of the special tabulating-keys is released its stop 58 will move downward and the type-writer escapement will be again rendered operative on the carriage ratchet-bar 7 to hold the carriage, for the time being, where positioned by the last-raised stop. After the first four character-keys have been operated the switch-key 35, marked with the letter "T," must be depressed, so as to couple the coupling-heads 61 to the pins 60 of the twenty-eight character-keys which are thereafter to be used as tabulating-keys. (See Fig. 4.) It should now be remembered that the depression of said switch-key 35 not only effects the coupling of the stop-plungers to the said twenty-eight keys, but moves the depressing-rod 50 forward, out from under the depressing-lugs 57 of the said twenty-eight keys, so that when any one of the said twenty-eight keys is depressed to raise the coupled stop-plungers 58 the escapement-tripping lever 25 will not be depressed and the type-writer escapement will not be drawn downward, but will simply be thrown rearward into an inoperative position by the upward movement of the bail 65 and rearward movement of the finger 66, as before described in connection with the action of the special tabulating-keys.

The stops which are intended to intercept the carriage and position the sheet with the columns marked "Shirts," "Collars," "Cuffs," &c., are far enough apart to permit two numerals to be printed in each column, while those which are intended to position the sheet with the columns marked "Sheets," "Table-cloths," &c., are only spaced far enough apart transversely of the machine to permit one numeral to be printed in each column. As shown in Fig. 5ª, the said closely-positioned stops are set in zigzag order.

It will of course be understood that it is not necessary to operate or throw up the stops in the regular order of succession, but that any number of intermediate stops may be skipped when there is no article to be recorded or listed in any particular column. It will also be understood that the character-keys, which may also be used as tabulating-keys, might have additional markings—such as "Shirts," "Collars," "Cuffs," &c.—to indicate the stops which they are arranged to operate.

What I claim, and desire to secure by Letters Patent of the United States, is as follows:

The combination with a type-writer having numeral and character keys, and key-actuated carriage-escapement mechanism, of a depressible and laterally-adjustable escapement-actuating rod, said numeral-keys having depressing-lugs that always overlie said depressing-rod, and said character-keys having depressing-lugs which overlie said rod only under one adjustment thereof, a plurality of carriage-intercepting tabulating-stops, stop-actuating connections having coupling-heads for coupling them to certain of the said character-keys, means for throwing the carriage-escapement out of action when one of said stops is rendered operative, a rock-shaft having reversely-beveled arms, switch-keys operative on said cam-arms, to rock the same in reverse directions, and connections from said rock-shaft to said coupling-heads and to said depressing-rod arranged to simultaneously move the latter into coupling positions and to move said depressing-rod from under the depressing-lugs of said character-keys, substantially as described.

In testimony whereof I affix my signature in presence of two witnesses.

FREDERICK W. HUNT.

Witnesses:
ROBERT C. MABEY,
F. D. MERCHANT.